United States Patent [19]

Soria et al.

[11] Patent Number: 5,395,954
[45] Date of Patent: Mar. 7, 1995

[54] ORGANIC-INORGANIC POLYCONDENSATE AND A METHOD OF OBTAINING THE SAME

[75] Inventors: Raymond Soria, Bazet; Sophie Cominotti, Tarbes; Jacques Gillot, Laloubere, all of France

[73] Assignee: Societe des Ceramiques Techniques, Bazet, France

[21] Appl. No.: 92,897

[22] Filed: Jul. 19, 1993

[30] Foreign Application Priority Data

Jul. 20, 1992 [FR] France .................. 92 08926

[51] Int. Cl.⁶ .................. C07F 7/00; C07F 11/00
[52] U.S. Cl. .................. 556/10; 556/9; 556/27; 556/28; 556/42; 556/51; 556/57; 204/157.75
[58] Field of Search .................. 556/9, 10, 27, 28, 42, 556/51, 57, 443, 465, 467; 204/157.75

[56] References Cited

U.S. PATENT DOCUMENTS 3,403,050  9/1968  Chada .................. 117/161

FOREIGN PATENT DOCUMENTS

0358238A3  3/1990  European Pat. Off. .
0319384A3  6/1989  France .
1069057    1/1957  Germany .
2023976    5/1970  Germany .

OTHER PUBLICATIONS

French Search Report FR 9208926-dated Apr. 07, 1993.

*Primary Examiner*—José G. Dees
*Assistant Examiner*—Porfirio Nazario-Gonzalez
*Attorney, Agent, or Firm*—Sughrue, Mion, Zinn, Macpeak & Seas

[57] ABSTRACT

An organic-inorganic polycondensate characterized by the fact that it satisfies the following formula:

$$C_v H_w O_x Si_y Me_z$$

where:
  $v = 4$ to $48$
  $w = 5$ to $52$
  $x = 5$ to $48$
  $y = 2$ to $16$
  $z = 1$
  the ratio $v/(y+z)$ being less than 7;

$C_v H_w$ being a carbon-containing chain carried by silicon; and

Me being a metal or a mixture of metals chosen from groups IVA, VA, VIA, IIIB, and IVB of the periodic table of elements.

6 Claims, No Drawings

ORGANIC-INORGANIC POLYCONDENSATE AND A METHOD OF OBTAINING THE SAME

The present invention relates to a solid organic-inorganic polycondensate belonging to the family of products referred to as ORMOSILS (organically modified silicates) or ORMOCERS (organically modified ceramics).

These products are amorphous structures of organic-inorganic chains linked together by polymerized organic functional groups or by metal atoms via oxygen bridges.

Hou and Scholze (J. Non-Crystalline Solids, 100, 1988, 418–423) have described synthesizing a silicon titanium heteropolycondensate. That compound has no organic functional group, and its concentration of metal atoms is relatively low.

Schmidt and Seiferling (Mat. Res. Soc. Symp. Proc. 73, 1986, 739–750) or Kohjiya, Ochiai and Yamashita (J. Non-Crystalline Solids, 119, 1990, 132–135) have already presented organic-inorganic condensates. However, those products contain few or no metal elements. The low metal atom content in that type of product is due to the high speed at which the metal derivatives are hydrolyzed.

At the Seville Glass Workshop in 1990, Dire, Baboneau, Carturan and Livage demonstrated precipitation and segregation of titanium. Segregation gave rise to two products, namely titanium oxide, and a condensate having a low titanium atom content and integrated into the lattice.

The speed of hydrolysis of the metal compound can be controlled by chemically modifying the structure thereof, e.g. by using acetic acid as shown by Doeuff, Henry, Sanchez and Livage (J. Non-Cryst. Solids, 89, 1987, 84) in the case of titanium. However, that operation is complex, costly, and time-consuming, and it requires special know-how.

It has been observed that, for many uses, currently-known ORMOCILS or ORMOCERS have insufficient chemical resistance to acids and to bases, and decomposition temperatures that are too low.

An object of the present invention is to provide products of the preceding family that have improved chemical and thermal properties.

Another object of the present invention is to describe one of the various possible methods of synthesizing the preceding products.

The present invention provides an organic-inorganic polycondensate characterized by the fact that it satisfies the following formula:

$$C_v H_w O_x Si_y Me_z$$

where:
v = 4 to 48
w = 5 to 52
x = 5 to 48
y = 2 to 16
z = 1
the ratio $v/(y+z)$ being less than 7;
$C_v H_w$ being a carbon-containing chain carried by silicon; and
Me being a metal or a mixture of metals chosen from groups IVA, VA, VIA, IIIB, and IVB of the periodic table of elements.

Preferably, said ratio $v/(y+z)$ is less than 5.

In preferred embodiments, Me is chosen from Ti, Zr, Hf, Ta, W, Al, and Si.

The above-defined products differ from prior art condensates in that they have high metal atom contents and high silicon contents.

This special composition makes it possible to obtain chemical properties, thermal properties and mechanical properties (such as the coefficient of diffusion) that are improved:

the chemical resistance to acids, bases and solvents is considerably improved as a result of the increase in the metal element content; moreover, for identical molar concentration, the higher the atomic number of the metal atom, the better the resistance to corrosion;

the higher the metal atom content, the greater the thermal resistance, i.e. the decomposition temperature; and the coefficient of thermal expansion also depends on the metal atom content; by controlling this concentration, it is possible to adapt the ORMOCER of the invention to products such as ceramics based on zirconium.

The present invention also provides a method of manufacturing an organic-inorganic polycondensate such as defined above, and characterized by the facts that, in a first step, a liquid precursor is made having a polymerizable functional group carried by the carbon-containing chain of silicon, and that, in a second step, said precursor is cross-linked by raising its temperature and/or exposing it to ultraviolet radiation;

said first step consisting in causing:
at least one metal derivative of formula $MeR_X$ where:
R represents either a hydrolyzable group such as a halogen atom, alcoxy, acyloxy, acetyl acetonate, or alcoxy, or else a hydroxy group; and
X represents the valence of the metal element;
to react with at least one functionalized silane of formula $R'_n Si(R''Y)(4-n)$ where:
R' represents at least one hydrolyzable organic group of the alcoxy, aryloxy, or hydrogen atom type, or else a hydroxy group;
R''Y represents a functionalized and non-hydrolyzable chain in which R'' represents a chain that is carbon-containing, saturated, unsaturated, cyclic or aromatic, optionally including heteroatoms such as oxygen, and Y represents a remainder that is reactive under the reaction conditions, such as an epoxy group or an unsaturate, a vinyl group or an allyl group; and
n is less than 4.

In a preferred implementation, in said first step, firstly said functionalized silane is partially pre-hydrolyzed by adding water, in an acid medium or a basic medium, optionally in an organic medium, the quantity of added water being less than the stoichiometric quantity.

Preferably, the required acid is added in the form of an alcohol solution.

Partially pre-hydrolyzing the functionalized silane releases a portion of the condensation sites on the silicon for the metal compound. When said metal compound is added, it condenses on the hydrolyzed positions of the functionalized silane. It is thus possible to add high concentrations of metal derivative without the derivative precipitating, and thereby forming metal oxide particles within the organo-silicon lattice, this phenomenon being highly detrimental to all the properties of the ORMOCER.

The condensation reaction is continued with a reflux step which enables the molecular polycondensation to be completed.

Distillation or evaporation is then performed to remove any organic solvents, water, alcohol, acids or bases, etc.

At this stage, an ORMOCER precursor is obtained that is stable and liquid, that can be stored, and that constitutes an intermediate product of the invention.

In the second step, the ORMOCER precursor is polymerized. This can be performed either by increasing temperature (thermal polymerization) or by exposure to ultraviolet radiation.

The thermal cycle used for the polymerization is characterized by three specific points:

a) temperature is increased relatively slowly (30° C./hour at the most);

b) there is a long pause at a temperature lying in the range 60° C. to 100° C.; and c) there is a cross-linking pause at a temperature lying in the range 110° C. to 160° C., in order to obtain the most uniform polymerization possible.

Advantageously, the ultraviolet radiation has a wavelength of 245 nanometers.

Optionally, the polymerization may be performed by associating exposure to ultraviolet radiation with an increase in temperature.

In a variant of the method of the invention, the ORMOCER is exposed to ionizing radiation, e.g. gamma radiation or electron radiation. This radiation causes reaction centers to be formed, which centers cause additional bonds to be formed between the various ORMOCER chains, in addition to the bonds formed during cross-linking. The higher concentration of bonds causes an improvement in the physico-chemical properties of the product, in particular in its coefficient of expansion and in its chemical resistance. An identical effect is obtained with high-power ultrasound.

The present invention also provides many uses for the above-defined polycondensates, in particular for bonding two parts together, for making composite structures, for impregnating porous parts, and for forming anti-abrasive or anti-chemical-corrosion coatings; in most cases, the polycondensate is implemented when it is in its liquid precursor state, with cross-linking being performed subsequently.

A first use consists in bonding together materials, in particular ceramics. The liquid precursor of the ORMOCER is deposited on the surfaces to be bonded together, and said surfaces are then placed in contact with each other. Cross-linking is performed thermally. After cooling, a single part is obtained; the bonding enables the resulting part to be machined. With this technique, it is possible to obtain bonding between different materials by adapting the properties of the ORMOCER, so as to obtain "sandwich" products.

A second use consists in obtaining products of complex shape. The liquid precursor may be cast in a mold having a complex geometric shape. Cross-linking is performed by exposure to ultraviolet radiation or by increasing the temperature, thereby producing a solid part which retains the exact shape of the mold. Compared with slip casting, this technique avoids the invariably critical step of drying the part. Compared with using plastics, the use of ORMOCERS gives products that have better physico-chemical properties.

A third use consists in obtaining composite structures Which are either infiltrated composites, or sandwich composites.

For infiltrated composites, the liquid precursor of the ORMOCER is caused to penetrate into a porous ceramic, e.g. made of sintered metal or of sintered glass. Cross-linking is performed either thermally, or by exposure to radiation inside the porous ceramic.

For sandwich composites, multi-layer structures are made using ORMOCERS of different compositions. To this end, films of liquid precursor are formed, e.g. by using the strip casting technique. The resulting strip is partially cross-linked (e.g. by being heated to the temperature of the intermediate period in the cross-linking cycle, i.e. to a temperature lying in the range 60° C. to 100° C.). The partially cross-linked strips of the various ORMOCERS are then either assembled together and are cross-linked by being baked, or else they are used as deposition supports for layers of different precursors, the cross-linking baking being performed after the last layer has been deposited.

A fourth use consists in sealing a porous membrane in order to prevent product leakage from the end of the membrane. Such leakage is detrimental to the separation performance levels of the membrane. This result is obtained by using methods similar to those used to obtain infiltration composites.

A fifth use consists in obtaining anti-abrasive or anti-chemical-corrosion coatings. To this end, a film of the liquid precursor is deposited on the surface of the items to be protected, either by immersion, by painting, or by spraying with a gun. The coating is then cross-linked either thermally, or by exposure to ultraviolet radiation.

These uses are given purely by way of non-limiting example. In the same way, the following examples show, by way of indication, some formulations of ORMOCERS together with some uses therefor.

EXAMPLE 1

An ORMOCER was prepared by prehydrolyzing (3,4 epoxy cyclohexyl) ethyl trimethoxy silane (120 millimoles) with an aqueous solution of hydrochloric acid (0.009 millimoles) for one night. 30 millimoles of zirconium isopropoxide and 0.208 millimoles of hydrochloric acid in aqueous solution were then added. Condensation was completed by performing a reflux step (70° C.) for 30 minutes. After the solvents had been removed by evaporation in a vacuum and cooling, a viscous liquid (120 mPas) was obtained. This was the liquid precursor. Cross-linking baking (150° for two hours) was then performed, with the temperature being raised at a speed of 30° C./hour, and with the cycle including a pause of 16 hours during which the temperature remained at 65° C.

Chemical analysis gave the following formula as the composition of the ORMOCER:

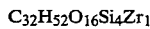

i.e. a ratio $C/(Si+Zr)=6.4$

The decomposition temperature of the product was 220° C. The resistance of the final product to chemical corrosion was tested in an acid medium (molar nitric acid: 24 hours at ambient temperature) and in a basic medium (molar sodium hydroxide: 24 hours at ambient temperature) with no degradation of the pieces being observed.

The product was used to obtain a cylinder whose outside surface had three projecting strips. To this end, the liquid precursor obtained as an intermediate product during synthesis of the ORMOCER was poured into a mold. Cross-linking baking was then performed under the above-defined conditions. After being baked and removed from the mold, a part was obtained that could be used directly.

EXAMPLE 2

An ORMOCER was prepared by prehydrolyzing trichlorovinyl silane (45 millimoles) and 0.05 millimoles of hydrochloric acid in aqueous solution, and 50 ml of equimolar water-ethanol solution as the solvent. The reaction took place in the absence of air and at ambient temperature for 15 hours. 4 millimoles of titanium hydroxide were then added. After the solvents had been removed, a viscous liquid (viscosity: 98 mPas) was obtained. This was the precursor of the ORMOCER. It was cross-linked by being baked. After pausing for 10 hours at 50° C., the temperature increased at a speed of 10° C./hour up to 140° C. and paused thereat for a period of 6 hours.

Chemical analysis gave the following formula for the ORMOCER:

$$C_{23}HO_5Si_{11}Ti_1$$

i.e. a ratio $C/(Si+Ti)=1.92$

Thermal analysis gave a decomposition temperature of 290° C., and expansion measurement gave a coefficient $\alpha$ of $8 \times 10^{-6} K^{-1}$.

In order to seal a multi-channel filtering membrane made of a porous ceramic (porosity 33%, diameter 12 μm), both ends of the filter member were impregnated by immersing them in the liquid precursor of the ORMOCER stirred by ultrasound (60 kHz). The precursor penetrated the pores in the end of the unit and extended over a length of 12 mm. After draining off the surplus precursor, the remainder was cross-linked by using the above-described thermal cycle.

By observation under a scanning electron microscope, it was possible to verify that the pores in the end of the filter member were completely filled.

A corrosion test was performed alternately under acid conditions ($HNO_3$ 10% by mass, pH=0, $\theta=80°$ C.) and under basic conditions (NaOH 10% by mass, pH>14 and $\theta=90°$ C.). No reduction in filling characteristics was apparent after 150 corrosion cycles.

Matching of the expansion characteristics of the ceramic and of the ORMOCER was tested by applying thermal shocks between +150° C. (hot oil) and −20° C. (brine). After 100 thermal shocks, no degradation of the mechanical properties was apparent.

EXAMPLE 3

The ORMOCER described in example 2 was used to make a composite by infiltration.

To this end, the liquid precursor was caused to infiltrate into a fiber-glass fabric. The fabric was placed in a sealed enclosure in which there was a partial vacuum (10 mbars). The liquid precursor was caused to penetrate into the enclosure, thereby infiltrating into the glass fabric. The fabric was then removed from the enclosure and drained to remove the surplus precursor.

The liquid precursor was then cross-linked by being exposed to ultraviolet radiation (wavelength=245 nm). The exposure to radiation lasted 6 hours at ambient temperature.

EXAMPLE 4

An ORMOCER was prepared by prehydrolyzing triethoxy vinyl silane (40 millimoles) with water (10 millimoles), in the presence of 5 millimoles of hydrochloric acid in an alcohol solution. 20 millimoles of ethoxy tantalum were then added. After 30 minutes of stirring, a further 30 millimoles of water were added. Condensation was continued at 70° C. for 5 hours. After the condensation products and the solvents had been removed, a liquid having viscosity of 53 mPas was obtained.

The liquid precursor was cross-linked by being baked at 125° C. for 5 hours, the temperature being increased at a speed of 12° C./hour, and pausing at 75° C. for 3 hours.

Chemical analysis gave the following composition for the ORMOCER:

$$C_4H_6O_5Si_2Ta_1$$

i.e. a ratio $C/(Si+Ta)=1.33$.

Thermal analyses gave a decomposition temperature of 320° C. and a coefficient of expansion of $4 \times 10^{-6} K^{-1}$.

In order to bond together two square alumina plates having sides of 3 cm, 0.5 g of the liquid precursor were spread over the surface of one of the two plates. This deposition was covered with the second plate, and the resulting assembly was baked using the above-defined thermal cycle.

After baking, the two plates were bonded together very well. The chemical resistance of the bonding was tested by immersing the bonded assembly in different media: phosphoric acid (2 molar), potassium hydroxide (1 molar), dimethyl sulfoxide, and acetone, without any of the media giving rise to a reduction in the cohesion of the bonded assembly.

EXAMPLE 5

An ORMOCER was prepared by prehydrolyzing propargyl trimethoxy silane (175 millimoles) with 0.2 millimoles of hydrochloric acid in an alcohol solution and 55 millimoles of water, while stirring for 30 minutes. 11 millimoles of tungsten acetyl acetonate were then added, followed by 5.3 millimoles of hydrochloric acid in ethanol solution and 35 millimoles of water. Condensation was continued for 6 hours at 60° C. After the solvents and the condensation removal products had been removed, a liquid having viscosity of 68 mPas was obtained.

This liquid precursor was cross-linked by being baked at 100° C for 10 hours, the temperature being increased at a speed of 8° C./minute (with an intermediate period of 3 hours during which the temperature paused at 55° C.).

Chemical analysis of the ORMOCER gave the following composition:

$$C_{49}H_{49}O_{49}Si_{16}W_1$$

i.e. a ratio $C:(Si+W)=2.82$.

Thermal analysis gave a start-of-decomposition temperature of 230° C. and a coefficient of expansion of $22 \times 10^{-6} K^{-1}$.

Corrosion tests were conducted on strips of the product in an acid medium (sulfuric acid: 30% by mass), in a basic medium (sodium hydroxide: 10% by mass), and a solvent medium (ethanol) without the product being degraded.

In order to use the product to make an anti-abrasion and anti-corrosion coating, a film of the liquid precursor was deposited on the inside of a metal tube. One way of depositing the film is to block off the bottom end of the tube, to fill it with the precursor, and then, one minute later, to empty it. Cross-linking baking was then performed as indicated above.

A suspension of alumina particles in a nitric acid medium (1 molar) was then caused to circulate inside the tube for 15 hours, with the particles travelling at a speed of 2 m/s. After the experiment was stopped, no degradation of the coating was observed.

EXAMPLE 6

An ORMOCER was prepared by prehydrolyzing glycidoxypropyl trimethoxy silane (240 millimoles) by adding 1 millimole of hydrochloric acid in ethanol solution and 50 millimoles of water, while stirring for 30 minutes. 30 millimoles of aluminum phenoxide and 35 millimoles of tetra ethoxy hafnium were then added, followed by 15.4 millimoles of hydrochloric acid in ethanol solution and 75 millimoles of water. Condensation was continued for 6 hours at 60° C. After the solvents and the condensation removal products had been removed, a liquid having viscosity of 68 mPas was obtained. This liquid precursor was cross-linked by being baked at 100° C. for 10 hours, the temperature being increased at a speed of 8° C./minute (with an intermediate period of 3 hours during with the temperature paused at 75° C.).

Chemical analysis of the ORMOCER gave the following as its composition:

$$C_{22}H_{41}O_{16}Si_4Al_{0.46}Hf_{0.54}$$

i.e. a ratio C:(Si+Al+Hf) of 4.4

Thermal analyses gave a start-of-decomposition temperature of 220° C. and a coefficient of expansion of $34 \times 10^{-6}$ K$^{-1}$.

By using the strip-casting technique, the liquid precursor was formed into a strip of 20 cm by 5 cm that was baked at 75° C. for 3 hours. These conditions correspond to the conditions of the intermediate period in the above-defined cross-linking cycle. Using the same technique, a strip of the synthesized precursor in example 5 was deposited on the first strip, and the resulting assembly was baked at 55° C. for 3 hours.

A strip was also prepared using the synthesized precursor in example 2. This strip was baked at 50° C. for 10 hours. This new strip was deposited on the preceding assembly, and then cross-linked at 140° C. for 6 hours (speed of rise in temperature 10° C./hour).

Ultimately, a "sandwich" structure comprising films stacked on one another was obtained.

Naturally, the invention is not limited to the above-described embodiments. Any means may be replaced by equivalent means without going beyond the ambit of the invention.

We claim:

1. An organic-inorganic polycondensate having the following formula:

$$C_vH_wO_xSi_yMe_z$$

where:

v=4 to 48
w=5 to 52
x=5 to 48
y=2 to 16
Z=1 the ratio v/(y+z) being less than 7; and
Me being a metal or a mixture of metals selected from the group consisting of Ti, Zr, Hf, Ta, W and Al.

2. A polycondensate according to claim 1, characterized by the fact that said ratio v/(y+z) is less than 5.

3. A method of manufacturing an organic-inorganic polycondensate which satisfies the following formula:

$$C_vH_wO_xSi_yMe_z$$

where:

v=4 to 48
w=5 to 52
x=5 to 48
y=2 to 16
z=1 the ratio v/(y+z) being less than 7; and
Me being a metal or a mixture of metals selected from the group consisting of Ti, Zr, Hf, Ta, W and Al;
said method comprising, in a first step, a liquid precursor is made having a polymerizable functional group carried by the carbon-containing group of silicone, and that, in a second step, said precursor is cross-linked by raising its temperature and/or exposing it to ultraviolet radiation;
said first step consisting in causing:
at least one metal derivative of formula MeR$_x$ where:
R represents a hydrolyzable group, or a hydroxy group; and X represents the valence of the metal element;
to react with at least one functionalized silane of formula R'$_n$Si(R"Y)(4−n) where:
R' represents at least one hydrolyzable group or a hydroxy group;
R"Y represents a functionalized and nonhydrolyzable group in which R" represents a carbon-containing, saturated, unsaturated, cyclic or aromatic group, optionally containing at least one hetero atom, and Y represents a remainder that is reactive under the reaction conditions and that is selected from the group consisting of an epoxy group, an unsaturate group, a vinyl group and an allyl group; and n is less than 4;
and further, in said first step:
firstly said functionalized silane is partially prehydrolyzed by adding water, in an acid medium or a basic medium, optionally in an organic medium, the quantity of added water being less than the stoichiometric quantity;
said metal derivative is then added and it condenses;
the condensation reaction is continued with a reflux step which enables the molecular polycondensation to be completed; and
distillation or evaporation is then performed.

4. A method according to claim 3, of manufacturing an organic-inorganic polycondensate which satisfies the following formula:

$$C_vH_wO_xSi_yMe_z$$

where:

v=4 to 48
w=5 to 52 x = 5 to 48
y = 2 to 16
Z = 1 the ratio v/(y+z) being less than 7; and

Me being a metal or a mixture of metals selected from the group consisting of Ti, Zr, Hf, Ta, W and Al;

said method comprising, in a first step, a liquid precursor is made having a polymerizable functional group carried by the carbon-containing group of silicone, and that, in a second step, said precursor is cross-linked by raising its temperature and/or exposing it to ultraviolet radiation;

said first step consisting in causing:

at least one metal derivative of formula $MeR_x$ where:
R represents a hydrolyzable group, or a hydroxy group; and X represents the valence of the metal element;

to react with at least one functionalized silane of formula $R'_nSi(R''Y)(4-n)$ where:
R' represents at least one hydrolyzable group or a hydroxy group;
R''Y represents a functionalized and nonhydrolyzable group in which R'' represents a carbon-containing, saturated, unsaturated, cyclic or aromatic group, optionally containing at least one hetero atom, and Y represents a remainder that is reactive under the reaction conditions and that is selected from the group consisting of an epoxy group, and unsaturate group, a vinyl group and an allyl group; and n is less than 4;

and further the cross-linking heat treatment of the said precursor includes in succession:

a) increasing temperature relatively slowly at 30° C./hour at the most;
b) pausing for a period at a temperature lying in the range 60° C. to 100° C.; and
c) pausing for a cross-linking period at a temperature lying in the range 110° C. to 160° C.

5. A method according to claim 3, characterized by the fact that the ultraviolet radiation used for cross-linking has a wavelength of 245 nanometers.

6. A method according to claim 5, characterized by the fact that it includes an additional period of exposure to gamma radiation or to ultrasound.

* * * * *